United States Patent
Foster et al.

(10) Patent No.: US 6,356,632 B1
(45) Date of Patent: Mar. 12, 2002

(54) CALL SELECTION AND AGENT SELECTION IN A CALL CENTER BASED ON AGENT STAFFING SCHEDULE

(75) Inventors: Robin H. Foster, Little Silver, NJ (US); William E. Gourlay, Santa Ana, CA (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/224,043

(22) Filed: Dec. 31, 1998

(51) Int. Cl.$^7$ ................................................ H04M 3/00
(52) U.S. Cl. ............................. 379/265.04; 379/266.03
(58) Field of Search ................................. 379/265, 266, 379/309, 201, 216, 214, 212, 213

(56) References Cited

U.S. PATENT DOCUMENTS

| | | | | |
|---|---|---|---|---|
| 4,943,995 A | * | 7/1990 | Daudelin et al. ........ | 379/88.03 |
| 5,206,903 A | | 4/1993 | Kohler et al. | |

* cited by examiner

Primary Examiner—Creighton Smith
(74) Attorney, Agent, or Firm—Ryan, Mason & Lewis, LLP

(57) ABSTRACT

A call center is configured such that call selection and/or agent selection processes may be based at least in part on stored information regarding agent schedules, such as scheduled break times, training sessions, ends of shifts or other events for the agents. In an illustrative embodiment, schedule information is stored for at least one of the call center agents, and a communication is selected for delivery to the agent based at least in part on the stored schedule information for that agent. For example, a call selection process in the call center may be modified for a designated period of time before a scheduled break of a given agent such that the call selected for delivery to that agent is likely to be completed in the time remaining until the scheduled break. As another example, an agent selection process in the call center may be modified for a designated period of time before a scheduled break such that the agent selected to process a given call is one likely to complete the call in the time remaining until the scheduled break. The designated time period may vary depending on factors such as the type of scheduled event, or the type of agent. As another example, the modified selection process may run continuously, such that the stored agent schedule information is always active as a consideration in call selection and agent selection. The call center may be configured to select a call or other communication without reference to the stored agent schedule information under specified conditions, such as, for example, a staffing shortfall or an unusually heavy call volume.

33 Claims, 2 Drawing Sheets

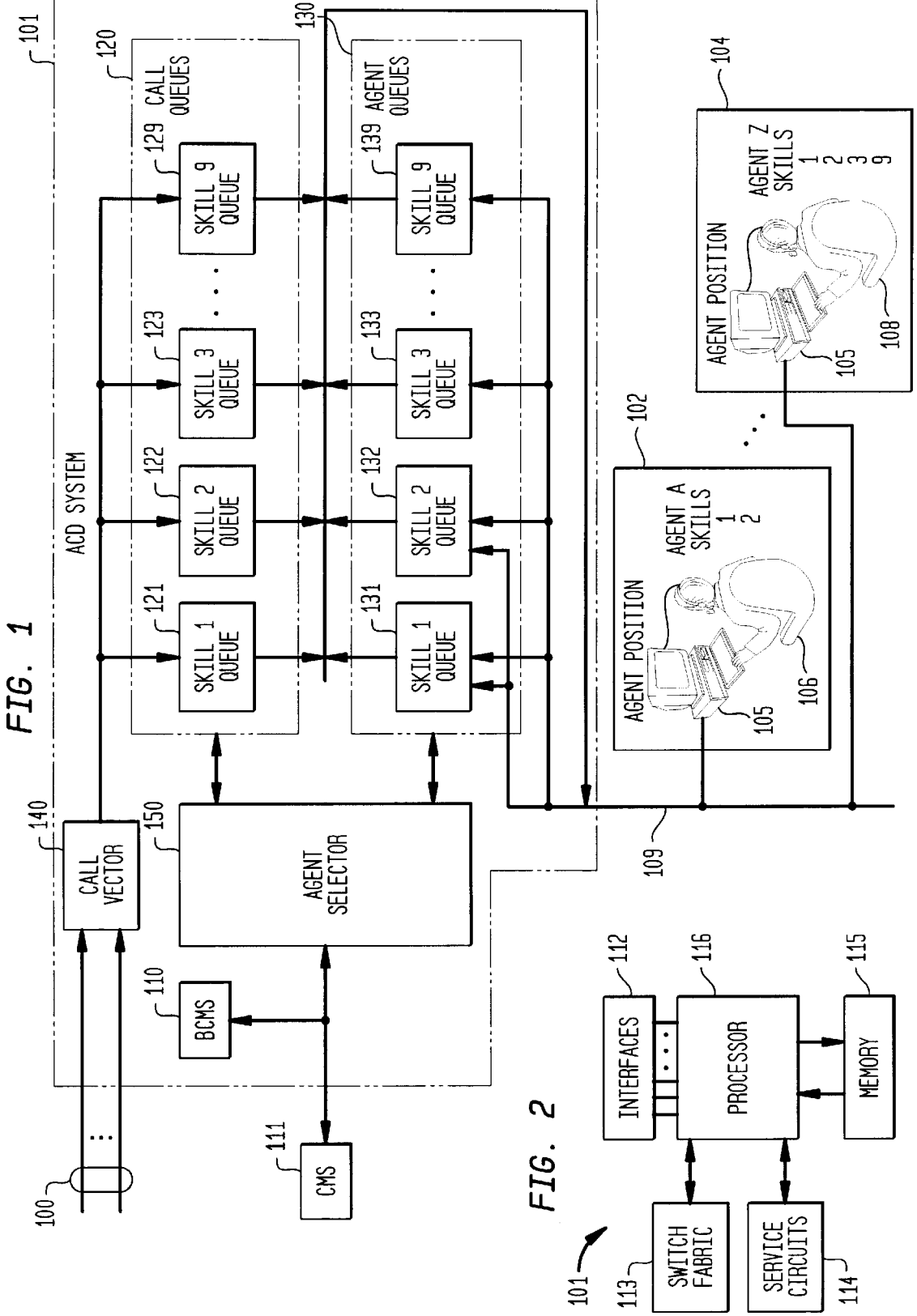

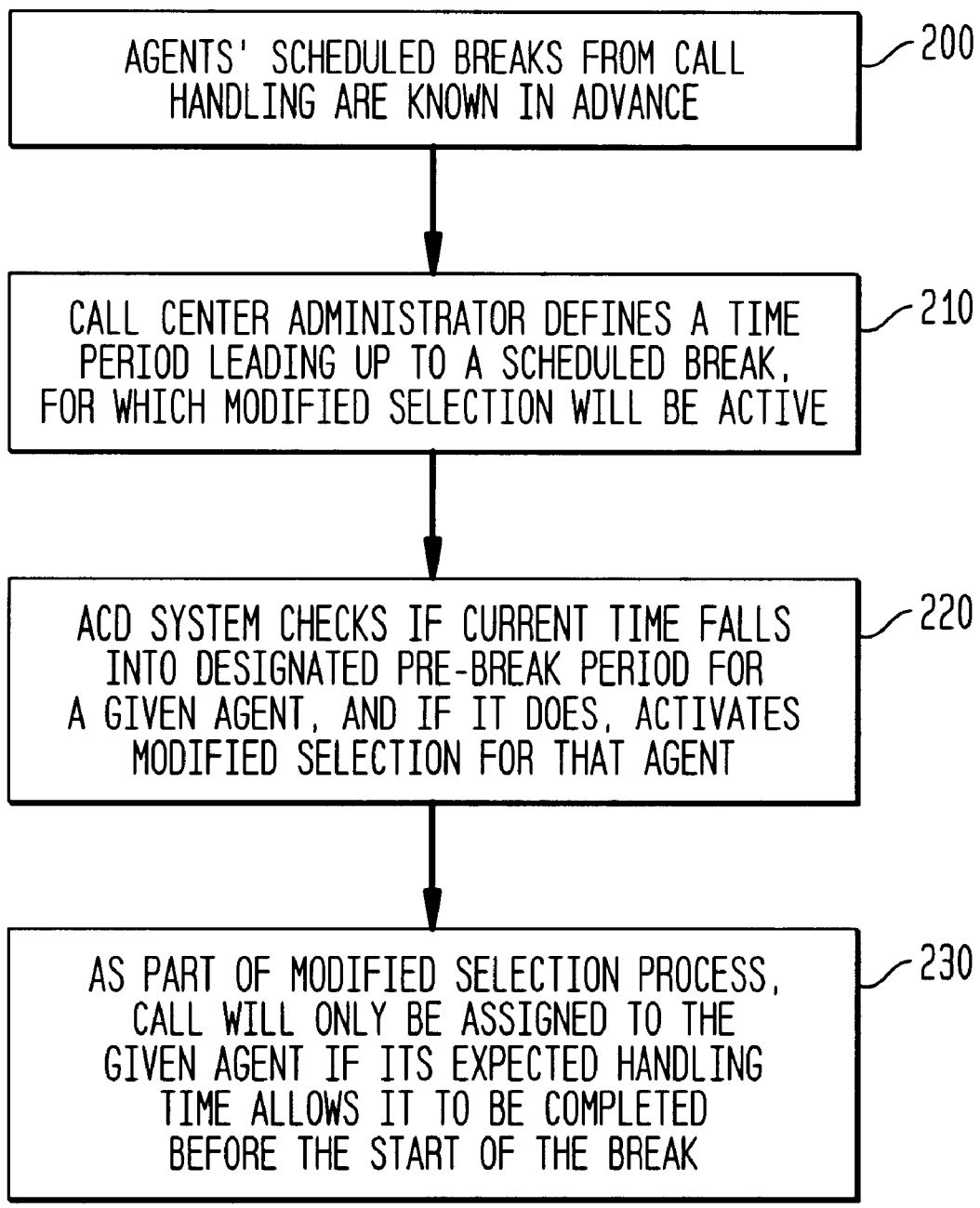

CALL SELECTION AND AGENT SELECTION IN A CALL CENTER BASED ON AGENT STAFFING SCHEDULE

FIELD OF THE INVENTION

The invention relates generally to call centers or other call processing systems in which voice calls, e-mails, faxes, voice messages, text messages, Internet service requests or other types of communications are distributed among a number of service agents for handling.

BACKGROUND OF THE INVENTION

Call centers distribute calls and other types of communications to available call-handling service agents in accordance with various predetermined criteria. In existing systems, the criteria for handling a call are often programmable by the operator of the system via a capability known as call vectoring. Typically, when the system detects that an agent has become available to handle a call, the system identifies the call-handling skills of the agent, usually in some order of priority, and delivers to the agent the longest-waiting call that matches the agent's highest-priority skill. Most conventional call distribution techniques generally focus on being "fair" to callers and agents. This fairness is reflected by the standard first-in, first-out call queuing and most-idle-agent call assignment process. The above-noted skills-based queuing improves upon this basic process in that it allows each agent to be placed into a number of different service categories based on the skill types supported by that agent.

In a conventional call center, call selection and agent selection are based on factors such as business rules focused on the callers in queue, availability of agents, objectives for handling each type of call, desired work mix for the agents, and an understanding of the skills that an available agent holds. Call centers generally want to maintain schedule adherence, i.e., agents should go to breaks, to lunch, to training sessions, etc. on time and return to work on time. A significant problem that arises in conventional call centers is that an agent may not be able, for example, to leave for a break promptly if a call assigned to that agent extends past the start of the break. If the break starts late, the agent is either late to return to work or must cut the break short. Although breaks, training and other similar events in the agent's work day are often scheduled in advance, this scheduling information is generally not taken into account in selecting calls or agents to process the calls. As a result, it is very difficult for the agents to adhere to an established schedule in a conventional call center. Conventional techniques have been unable to address this problem adequately. One such conventional technique allows an agent to enter a "pending unavailable" command on their terminal such that, as soon as the current call is completed, the agent automatically becomes unavailable for another call. Such a technique, however, does not ensure that a call actually delivered to an agent prior to the agent's pending unavailable action, is one that is likely to be completed by that agent before a scheduled break or other event.

As is apparent from the above, there is a need for improved call selection and agent selection in a call center, such that an established agent staffing schedule can be more closely adhered to without unduly sacrificing call processing performance.

SUMMARY OF THE INVENTION

The invention in an illustrative embodiment modifies a call selection and/or agent selection process to include consideration of scheduled breaks or other scheduled events of one or more of the agents. In an illustrative embodiment, the modified selection ensures, for example, in the case of call selection, that the call selected for delivery to a given agent is likely to be completed in the time remaining until the scheduled break of that agent, and in the case of agent selection, that the agent selected to process a given call is one likely to complete the call in the time remaining until the scheduled break of that agent. The invention thus stores agent schedule information, and uses the stored information in the call selection and/or agent selection processes such that agents receive only those calls that are likely to be completed before a scheduled event. In an alternative embodiment, the selected call may be permitted to extend slightly into the designated time period of a scheduled event. In other embodiments, the break or other scheduled event may be postponed, e.g., for performance reasons, while the agent handles one or more calls when call wait times have exceeded or are predicted to exceed a certain predefined threshold.

The selection modification of the invention may be activated for a designated time period before a scheduled event, and the designated time period may vary depending on factors such as the type of scheduled event, the type of agent for which selection modification is activated, or the typical call duration for a given agent. Alternatively, the modified selection process may run continuously, such that the stored agent schedule information is always active as a consideration in call selection and agent selection. The call center may also be configured to select a communication without reference to the stored agent schedule information in an emergency or other special situation, such as, for example, a staffing shortfall or an unusually heavy call volume.

Advantageously, the invention permits agents in a call center to more easily adhere to an established staffing schedule by, for example, ensuring that calls delivered to an agent are likely to be completed before the next scheduled break or other scheduled event for that agent. The use of stored agent schedule information to assist in call selection and/or agent selection eliminates situations in which breaks or other scheduled events are significantly delayed or missed altogether, and ensures more efficient processing of calls and thus improved call center performance. These and other features and advantages of the present invention will become more apparent from the accompanying drawings and the following detailed description.

BRIEF DESCRIPTION OF THE DRAWINGS

FIG. 1 is a block diagram of a call center that incorporates an illustrative embodiment of the invention.

FIG. 2 is a block diagram of the automatic call distribution (ACD) system implemented in the call center of FIG. 1.

FIG. 3 is a flow diagram illustrating modification of call selection and agent selection functions in the call center of FIG. 1 using agent schedule information in accordance with the invention.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication system which processes calls or other service requests, including voice calls, video calls, multimedia calls, e-mail, faxes or voice messages as well as various combinations of these and other types of communications. The term "schedule information" as used herein is intended to include, for example, information regarding a scheduled break for an agent, an end of a scheduled shift for an agent, a scheduled training session for an agent, a scheduled period of non-call work, e.g., call-related correspondence, for an agent, or any other type of information which characterizes an event specified in an agent schedule.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric and to provide automatic call distribution functionality.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels. Call vectoring is described in greater detail in Definity® Communications System Generic 3 Call Vectoring/Expert Agent Selection (EAS) Guide, AT&T Publication No. 555-230-520, Issue Nov. 3, 1993, which is incorporated by reference herein. Skills-based ACD techniques are described in greater detail in, for example, U.S. Pat. No. 5,206,903, which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system. Further details regarding call processing in a system such as ACD system 101 can be found in, for example, U.S. patent application Ser. No. 08/813,513 filed Mar. 7, 1997 and entitled "Waiting Call Selection Based on Anticipated Wait Times," and U.S. patent application Ser. No. 09/022,959 filed Feb. 12, 1998 and entitled "Call Center Agent Selection that Optimizes Call Wait Times," both of which are incorporated by reference herein.

In accordance with the invention, the call center of FIG. 1 includes a capability for implementing call selection and/or agent selection based on stored schedule information for a given set of agents. The invention in an illustrative embodiment modifies a call selection and/or agent selection process to include consideration of the scheduled breaks or other scheduled events of one or more of the agents. The modified selection ensures, in the case of call selection, that the call selected for delivery to a given agent is likely to be completed in the time remaining until the scheduled break of that agent, and in the case of agent selection, that the agent selected to process a given call is one likely to complete the call in the time remaining until the scheduled break of that agent. For example, if an agent can handle one of three waiting calls and it is known that this agent is scheduled to begin a break in 4 minutes, a call, if any, which is expected to be completed in 4 minutes or less is selected for that agent. Similarly, if there are three agents available to handle a given call expected to take 7 minutes to complete, the agent selection will not consider the agent scheduled to begin a break in 4 minutes.

The invention thus stores agent schedule information, and uses the stored information in the call selection and/or agent selection processes such that agents receive calls that are likely to be completed before a scheduled event. It should be noted that the invention may also be configured to permit a given selected call to extend slightly into the time period of a scheduled event of an agent selected to handle that call. The invention may also postpone the beginning of a break or other scheduled event in order to, for example, allow the agent to handle one or more calls if specific performance issues exist, such as call wait times exceeding or being predicted to exceed a certain predefined threshold.

A modified selection function in accordance with the invention may be implemented using one or more of the elements of the ACD system 101, such as, for example, the agent selector 150. More generally, the call processing based on stored agent schedule information may be implemented by processor 116 of FIG. 2 using program instructions and other information stored in the memory 115. In other embodiments of the invention, other elements of the FIG. 1 call center or any other type of call center may be used to provide call selection and/or agent selection based on stored agent schedule information.

FIG. 3 is a flow diagram showing the manner in which stored agent schedule information may be processed in an illustrative embodiment of the invention. It will be assumed without limitation that in the illustrative embodiment, one or more of the functions associated with the flow diagram are computed by processor 116 of ACD 101 operating in conjunction with memory 115 to execute appropriate stored program instructions. Step 200 indicates that agent's scheduled breaks from call handling are known in advance. For example, it may be known that agent Jack takes breaks from 9:50 to 10:05 AM, from 12:20 to 1:00 PM, and from 2:20 to 2:35 PM. Similarly, a training session, or any other type of predetermined event, may appear on the schedule of a given agent as a reason for taking the agent off of handling calls. In step 210, a call center administrator defines a time period, leading up to any given scheduled break or other scheduled event, for which the above-noted modified selection process will be active. For example, the administrator may specify that the modified selection process will be active, for any given agent, for a period of, e.g., five minutes before a scheduled break or other event for that agent.

It should be noted that the same period may be set for each of the agents, or different periods may be set for different agents or sets of agents. The period for a given agent may be set based on factors such as the typical call duration or the longest typical call duration the agent handles. In addition, although the designated time period may be the same for all types of breaks, it is also possible to establish different time periods for different types of breaks, e.g., a shorter time period before a short break, and a longer time period before a lunch period or training session. In alternative embodiments, the period may be, for example, set automatically through software program instructions, rather than set by an administrator. It should also be noted that, in other embodiments of the invention, the modified selection process may run continuously, such that the stored agent schedule information is always active as a consideration in call selection and agent selection.

In step 220 of FIG. 3, the call selection and/or agent selection processes of ACD system 101 periodically check whether or not the current time falls into the designated pre-break period for one or more of the agents, as established by the administrator in step 210. If the current time does fall into the designated pre-break period for an agent or agents, the modified selection is activated for the agent or agents. As shown in step 230, the modified selection process ensures that a call will only be assigned to a given agent if its expected handling time allows it to be completed before the start of the break. The expected handling time may be, for example, the expected "talk" time for the call, or the expected talk time plus any after call work time. In addition, the expected handling time may be determined as an average across a number of agents. Alternatively, the expected call handling time could be determined independently for individual agents or sets of agents. For example, an agent Jack may be a "mature" agent, who can process a given type of call in 2 minutes and 45 seconds, while another agent Sarah may be a novice agent who requires 3 minutes and 15 seconds to handle the same type of call.

Upon activation of the modified selection in step 230, the call selection process in the illustrative embodiment will not consider calls with an expected handling time that would extend into the break, and would thus choose among only those calls with an expected duration that would allow them to be completed before the break starts. As previously noted, the expected handling time may be permitted to extend slightly into the scheduled break by a designated period of time, such as a designated number of seconds. For example, if there are three minutes left until a scheduled break for a given agent, the call selection process may be permitted to deliver a call with an expected handling time of 200 seconds to that agent. Similarly, the agent selection process will not consider agents whose break time is too close to the expected completion time of a given call in selecting an agent to handle that call. It should be noted that the modification to the call selection and/or agent selection processes may be subject to one or more constraints on its applicability. For example, the system may be configured such that the selection modification will not be activated in the presence of specified conditions, such as a staffing shortfall, an unusually heavy call volume, or call wait times exceeding or being predicted to exceed a given threshold. This type of constraint recognizes that, under certain conditions, more pressing needs other than the scheduled taking of breaks should dictate the manner in which selection is implemented.

The above-described embodiments of the invention are intended to be illustrative only. For example, it should be noted that the exemplary configuration of the call center shown in FIG. 1 may be altered to incorporate a wide variety of different arrangements of components to provide the call selection and/or agent selection functions described herein. In addition, as previously noted, the invention can be applied to a wide variety of communications other than calls, including faxes and e-mails. The stored agent schedule information described above may be, for example, determined and implemented administratively, or through a computer-telephony integration (CTI) application. As another example, the invention can be implemented in an applications programming interface (API) with a workforce management software package. Furthermore, it should be noted that the invention may be implemented in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A variety of other implementations may also be used to obtain, store and process the scheduling information in accordance with the invention. These and numerous other alternative embodiments within the scope of the following claims will be apparent to those skilled in the art.

What is claimed is:

1. A method of selecting communications for delivery to one of a plurality of agents in a call center, the method comprising the steps of:

storing schedule information for at least one of the agents; and selecting a communication for delivery to the agent based at least in part on the stored schedule information for the agent;

wherein the storing step includes storing schedule information which includes at least one of a scheduled break for the agent, an end of a scheduled shift for the agent, a scheduled training session for the agent, and a scheduled period of non-call work for the agent.

2. A method of selecting communications for delivery to one of a plurality of agents in a call center, the method comprising the steps of:

storing schedule information for at least one of the agents; and selecting a communication for delivery to the agent based at least in part on the stored schedule information for the agent;

wherein the selecting step includes modifying a communication selection process in the call center such that the communication selected for delivery to a given agent is likely to be completed in an amount of time which is not substantially greater than an amount of time remaining until a scheduled event for the agent as indicated in the stored schedule information.

3. The method of claim 2 wherein an amount of time for which the communication is permitted to extend beyond a start time of the scheduled event is user-defined based on at least one of a type of skill involved in handling the communication, a characteristic of the agent and the type of scheduled event.

4. A method of selecting communications for delivery to one of a plurality of agents in a call center, the method comprising the steps of:

storing schedule information for at least one of the agents; and selecting a communication for delivery to the agent based at least in part on the stored schedule information for the agent;

wherein the selecting step includes modifying an agent selection process in the call center such that the agent selected to process a given communication is one likely to complete the communication in an amount of time which is not substantially greater than an amount of time remaining until a scheduled event for the agent as indicated in the stored schedule information.

5. The method of claim 4 wherein an amount of time for which the communication is permitted to extend beyond a start time of the scheduled event is user-defined based on at least one of a type of skill involved in handling the communication, a characteristic of the agent and the type of scheduled event.

6. A method of selecting communications for delivery to one of a plurality of agents in a call center, the method comprising the steps of:

storing schedule information for at least one of the agents;

selecting a communication for delivery to the agent based at least in part on the stored schedule information for the agent; and designating a time period prior to a scheduled event for which communications will be directed utilizing the stored agent schedule information.

7. The method of claim 6 wherein the time period varies depending upon the type of scheduled event.

8. The method of claim 6 wherein the time period is different for different agents.

9. A method of selecting communications for delivery to one of a plurality of agents in a call center, the method comprising the steps of:

storing schedule information for at least one of the agents;

selecting a communication for delivery to the agent based at least in part on the stored schedule information for the agent; and continuously modifying at least one of a communication selection process and an agent selection process in the call center to reflect changes in the stored agent schedule information.

10. A method of selecting communications for delivery to one of a plurality of agents in a call center, the method comprising the steps of:

storing schedule information for at least one of the agents; and selecting a communication for delivery to the agent based at least in part on the stored schedule information for the agent;

wherein the selecting step includes selecting based at least in part on a function involving an expected handling time determined using at least one of an average across a given number of the agents and an average for a given type of communication.

11. The method of claim 10 wherein the function is a designated percentage of the expected handling time.

12. A method of selecting communications for delivery to one of a plurality of agents in a call center, the method comprising the steps of:

storing schedule information for at least one of the agents; and selecting a communication for delivery to the agent based at least in part on the stored schedule information for the agent;

wherein the selecting step includes selecting based on an expected handling time determined for individual ones of the agents.

13. A method of selecting communications for delivery to one of a plurality of agents in a call center, the method comprising the steps of:

storing schedule information for at least one of the agents;

selecting a communication for delivery to the agent based at least in part on the stored schedule information for the agent;

selecting the communication without reference to the stored agent schedule information under specified conditions; and continuing to direct communications to the agent beyond a starting time of the scheduled event if conditions associated with at least one of a particular skill and the call center exceed a predefined threshold.

14. The method of claim 13 further including the step of limiting a number of communications directed to the agent or an amount of time for which such communications are directed to the agent, beyond the starting time of the scheduled event, in the presence of one of the conditions.

15. An apparatus for processing communications in a call center, the apparatus comprising:
   a memory for storing schedule information for at least one of the agents; and
   a processor coupled to the memory and operative to select a communication for delivery to the agent based at least in part on the stored schedule information for the agent.

16. The apparatus of claim 15 wherein the schedule information includes at least one of a scheduled break for the agent, an end of a scheduled shift for the agent, a scheduled training session for the agent, and a scheduled period of non-call work for the agent.

17. The apparatus of claim 15 wherein the processor is further operative to modify a communication selection process in the call center such that the communication selected for delivery to a given agent is likely to be completed in an amount of time which is not substantially greater than an amount of time remaining until a scheduled event for the agent as indicated in the stored schedule information.

18. The apparatus of claim 17 wherein an amount of time for which the communication is permitted to extend beyond a start time of the scheduled event is user-defined based on at least one of a type of skill involved in handling the communication, a characteristic of the agent and the type of scheduled event.

19. The apparatus of claim 15 wherein the processor is further operative to modify an agent selection process in the call center such that the agent selected to process a given communication is one likely to complete the communication in an amount of time which is not substantially greater than an amount of time remaining until a scheduled event for the agent as indicated in the stored schedule information.

20. The apparatus of claim 19 wherein an amount of time for which the communication is permitted to extend beyond a start time of the scheduled event is user-defined based on at least one of a type of skill involved in handling the communication, a characteristic of the agent and the type of scheduled event.

21. The apparatus of claim 15 wherein the processor is further operative to designate a time period prior to a scheduled event for which communications will be directed utilizing the stored agent schedule information.

22. The apparatus of claim 21 wherein the time period varies depending upon the type of scheduled event.

23. The apparatus of claim 21 wherein the time period is different for different agents.

24. The apparatus of claim 15 wherein the processor is further operative to continuously modify at least one of a communication selection process and an agent selection process in the call center to reflect changes in the stored agent schedule information.

25. The apparatus of claim 15 wherein the processor is further operative to select the communication based at least in part on a function involving an expected handling time determined using at least one of an average across a given number of the agents and an average for a given type of communication.

26. The apparatus of claim 25 wherein the function is a designated percentage of the expected handling time.

27. The apparatus of claim 15 wherein the processor is further operative to select the communication based on an expected handling time determined for individual ones of the agents.

28. The apparatus of claim 15 wherein the processor is further operative to select the communication without reference to the stored agent schedule information under specified conditions.

29. The apparatus of claim 28 wherein the processor is further operative to continue to direct communications to the agent beyond a starting time of the scheduled event if conditions associated with at least one of a particular skill and the call center exceed a predefined threshold.

30. The apparatus of claim 28 wherein the processor is further operative to limit a number of communications directed to the agent or an amount of time for which such communications are directed to the agent, beyond the starting time of the scheduled event, in the presence of one of the conditions.

31. An article of manufacture containing software which, when executed in a processor, causes the processor to perform the steps of:
   storing schedule information for at least one of the agents; and
   selecting a communication for delivery to the agent based at least in part on the stored schedule information for the agent;
   wherein the selecting step includes at least one of (i) modifying a communication selection process in the call center such that the communication selected for delivery to a given agent is likely to be completed in an amount of time which is not substantially greater than an amount of time remaining until a scheduled event for the agent as indicated in the stored schedule information, and (ii) modifying an agent selection process in the call center such that the agent selected to process a given communication is one likely to complete the communication in an amount of time which is not substantially greater than an amount of time remaining until a scheduled event for the agent as indicated in the stored schedule information.

32. A method of selecting communications for delivery to one of a plurality of agents in a call center, the method comprising the steps of:
   storing schedule information for at least one of the agents; and
   selecting an agent for processing a given communication based at least in part on the stored schedule information;
   wherein the selecting step includes at least one of (i) modifying a communication selection process in the call center such that the communication selected for delivery to a given agent is likely to be completed in an amount of time which is not substantially greater than an amount of time remaining until a scheduled event for the agent as indicated in the stored schedule information, and (ii) modifying an agent selection process in the call center such that the agent selected to process a given communication is one likely to complete the communication in an amount of time which is not substantially greater than an amount of time remaining until a scheduled event for the agent as indicated in the stored schedule information.

33. An apparatus for processing communications in a call center, the apparatus comprising:
   a memory for storing schedule information for at least one of the agents; and
   a processor coupled to the memory and operative to select an agent for processing a given communication based at least in part on the stored schedule information.

* * * * *